US008072839B2

(12) United States Patent
Guigné et al.

(10) Patent No.: US 8,072,839 B2
(45) Date of Patent: Dec. 6, 2011

(54) HAND-HELD ACOUSTIC CAMERA

(75) Inventors: Jacques Y. Guigné, Paradise (CA);
James A. Stacey, Paradise (CA);
Nicholas G. Pace, Bath (GB)

(73) Assignee: Intelligent Sciences, Ltd., Paradise, NL (CA)

( * ) Notice: Subject to any disclaimer, the term of this patent is extended or adjusted under 35 U.S.C. 154(b) by 350 days.

(21) Appl. No.: 12/485,080

(22) Filed: Jun. 16, 2009

(65) Prior Publication Data
US 2010/0315906 A1    Dec. 16, 2010

(51) Int. Cl.
G03B 42/06    (2006.01)
H04B 1/02    (2006.01)
(52) U.S. Cl. ........... 367/11; 367/138; 367/137; 367/117
(58) Field of Classification Search .................... 367/11, 367/138
See application file for complete search history.

(56) References Cited

U.S. PATENT DOCUMENTS

| | | | | |
|---|---|---|---|---|
| 3,736,552 A * | 5/1973 | Sessler et al. | | 367/7 |
| 3,895,339 A * | 7/1975 | Jones et al. | | 367/7 |
| 3,895,340 A * | 7/1975 | Gilmour | | 367/7 |
| 3,898,608 A * | 8/1975 | Jones et al. | | 367/7 |
| 3,937,066 A * | 2/1976 | Green et al. | | 73/607 |
| 4,025,805 A * | 5/1977 | Coltman et al. | | 310/335 |
| 4,060,791 A * | 11/1977 | Jones et al. | | 367/7 |
| 4,300,215 A * | 11/1981 | Jones | | 367/11 |
| 4,518,992 A * | 5/1985 | Kessler et al. | | 348/163 |
| 4,581,936 A * | 4/1986 | Granz et al. | | 73/599 |
| 5,598,206 A * | 1/1997 | Bullis | | 348/81 |
| 6,368,276 B1 * | 4/2002 | Bullis | | 600/437 |
| 6,700,833 B2 * | 3/2004 | Erikson | | 367/88 |

OTHER PUBLICATIONS

T. Scott Brandes, Robert H. Benson, "Sound source imaging of low-flying airborne targets with an acoustic camera array" Applied Acoustics, vol. 68, Issue 7, Jul. 2007, pp. 752-765.*

* cited by examiner

*Primary Examiner* — Thomas Tarcza
*Assistant Examiner* — James Hulka
(74) *Attorney, Agent, or Firm* — Richard A. Fagin

(57) ABSTRACT

An acoustic camera includes an acoustic transmitter disposed at one longitudinal end of a housing. The transmitter has a convex radiating surface. A diameter of the transmitter is about four times a wavelength of acoustic energy emitted by the transmitter. A plurality of acoustic receivers is disposed at spaced locations in a pattern extending laterally from the housing. A signal processor is in signal communication with the acoustic receivers. The signal processor is configured to cause the acoustic receivers to be sensitive along steered beams. The signal processor is configured to cause an end of the steered beams to move through a selected pattern within a beam width of the acoustic energy emitted by the acoustic transmitter. The signal processor is configured to operate a visual display device to generate a visual representation corresponding to acoustic energy detected by the acoustic receivers. A visual display device is in signal communication with the signal processor.

13 Claims, 7 Drawing Sheets

HAND-HELD ACOUSTIC CAMERA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of acoustic imaging. More particularly, the invention relates to hand-held acoustic imaging devices that may be used to visually assess an area in which optical imaging is obscured.

2. Background Art

Certain emergency situations, such as fires, result in interior spaces of buildings that may have hazards and trapped persons present therein. Rescue personnel may be prevented from readily determining the presence of such hazards and trapped persons by reason of smoke from the fire. Any optical searching tools, such as lights and cameras are similarly affected by smoke, making visual determination of the situation within a burning building difficult to determine.

In fire situations, infrared or other heat sensitive imaging may be impractical because of the fire itself.

There exists a need for devices that can image the interior of a building or other structure through smoke and haze. Such devices are preferably hand held and readily transportable by its users.

SUMMARY OF THE INVENTION

An acoustic camera includes an acoustic transmitter disposed at one longitudinal end of a housing. The transmitter has a convex radiating surface. A diameter of the transmitter is about four times a wavelength of acoustic energy emitted by the transmitter. A plurality of acoustic receivers is disposed at spaced positions in a pattern extending laterally from the housing. A signal processor is in signal communication with the acoustic receivers. The signal processor is configured to cause the acoustic receivers to be sensitive along steered beams. The signal processor is configured to cause an end of the steered beams to move through a selected pattern within a beam width of the acoustic energy emitted by the acoustic transmitter. The signal processor is configured to operate a visual display device to generate a visual representation corresponding to acoustic energy detected by the acoustic receivers. A visual display device is in signal communication with the signal processor.

Other aspects and advantages of the invention will be apparent from the following description and the appended claims.

DETAILED DESCRIPTION

Figure 1:
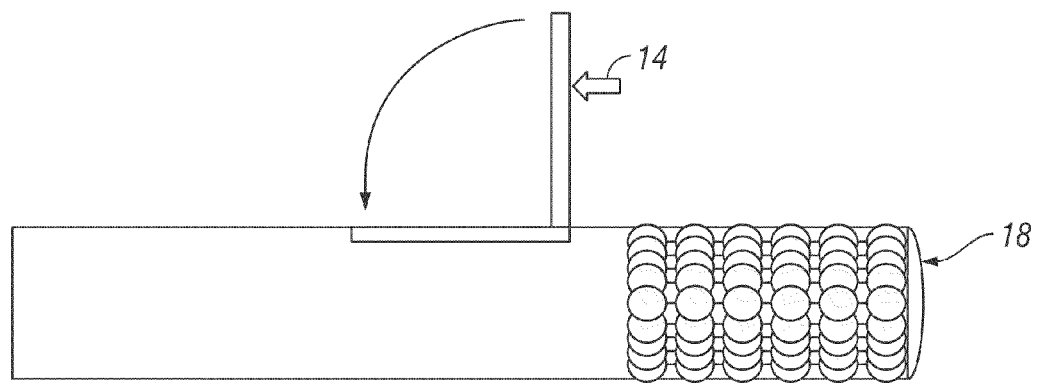
FIG. 1 is a side view of an example camera.
Figure 1A:
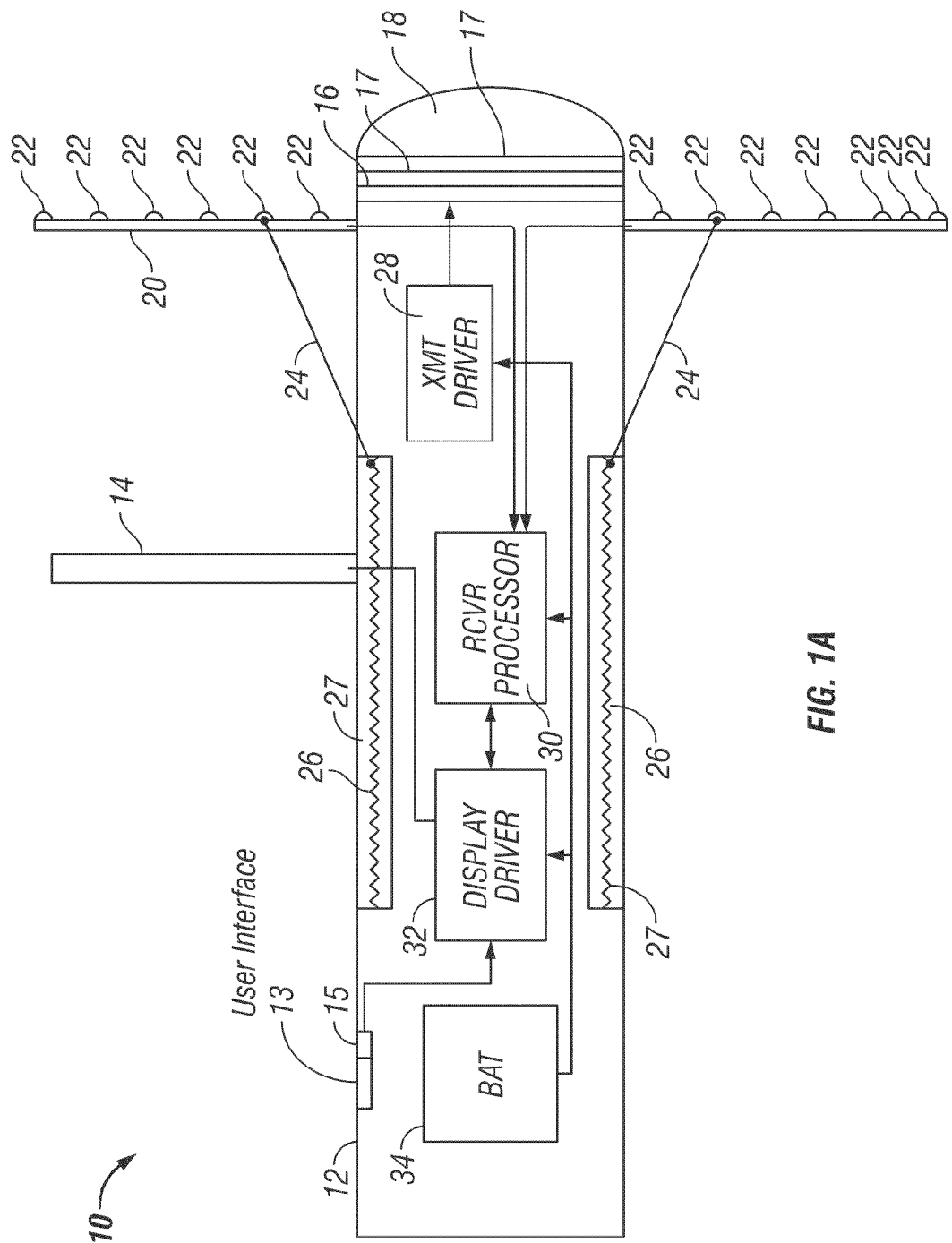
FIG. 1A is a cut away side view of the example camera of FIG. 1.

An example acoustic camera is shown in side view in FIG. 1, and in cut away side view in FIG. 1A. Reference herein is made to both figures for purposes of explaining the example acoustic camera. The camera 10 may be disposed in a water tight, substantially cylindrical housing 12 such as may be made from steel, aluminium, plastic or other suitable solid material. The housing 12 may include externally disposed slots 27 or similar recesses for deployment arms 24 or similar linkage each biased by a spring 26 or other biasing device to urge the deployment arms 24 longitudinally toward one end of the housing 12. The arms 24 are each pivotally coupled at their end to a corresponding receiver arm 20. The receiver arms 20 are pivotally coupled at one end to the housing 12. Acoustic receivers 22 are disposed on each receiver arm 20. The acoustic receivers 22 will be further explained below. An acoustic transmitter 16 may be disposed at the longitudinal end of the housing 12. The transmitter 16 may be a piezoelectric element and may be covered, for example by a number of material layers 17 of thickness explained below to act as impedance matching devices between the transmitter and a suitably shaped epoxy layer end cap 18. The function of the end cap 18 will be further explained below. The housing 12 may include in its interior a transmitter driver 28 in signal communication with the transmitter 16, which causes the transmitter 16 to emit acoustic pulses of selected frequency and duration. Examples of such pulses will be further explained below. A receiver processor 30, which may be a digital signal processor such as mixed signal application specific integrated circuit, may be in signal communication with each of the receivers 22 and configured to determined steered beams from signals detected by the receivers 22 in response to acoustic energy from the transmitter 16 reflecting from objects in the field of the acoustic output beam of the transmitter 16. The steered beams for the receiver signals will be explained further below. A display driver 32 receives signals from the receiver processor 32 corresponding to signals detected by the receivers 22 and preferably processed to generate the steered beams.

The display driver 32 and receiver processor 30 in combination may be configured to convert the signals detected by the receivers 22 into a two dimensional acoustic image, e.g., by display of amplitude of detected acoustic signals, for example, in a selectable range window at a selectable range in a corresponding gray scale or color scale with respect to position of the target as determined by the steered beam produced by the receiver processor 30 as it interrogates the receivers 22. Such two dimensional image may be transmitted from the display driver to a visual display device ("display") 14 such as a liquid crystal display or plasma display that converts signals from the display driver 32 into a visually observable display. The display 14 may also be pivotally coupled to the housing 12 so that it may be moved substantially flat against the housing 12 during transport and can be pivotally opened to the position as shown in FIG. 1A for use.

Electrical power to operate the foregoing electronic devices, including for example the display 14, the display driver 32, the receiver processor 30, the transmitter driver 28 and the transmitter 16 may be provided by suitable batteries 34 or similar energy storage device. A user interface 13, which may be, for example, a thumbwheel coupled to a potentiometer, a keypad, or other device that enables the user to input selected control signals to the display driver 32 and/or the receiver processor 30. The user interface 13 may include an audio transducer 15 such as small loudspeaker or piezoelectric device that may be used to generate audible signals, as will be explained in more detail below. The control signals from the user interface 13 may cause the camera 10 to operate in different modes, for example and as will be further explained below, to reduce the effective angular range of an image displayed on the display 14, or, for example, to change the operating mode of the transmitter 16 and the receivers 22 to enable distinguishing between types of objects detected as a result of acoustic energy from the transmitter 16 being reflected from such objects. The user interface 13 may also be used to select signal detection time, as will be explained below, so that an image generated on the display 14 will correspond to a selected distance or range thereof ob objects imaged by the camera 10.

FIG. 1 shows the camera 10 with the deployment arms (24 in FIG. 1A and receiver arms (20 in FIG. 1A) in their closed position. When the camera 10 is not in use, the foregoing as well as the display 14 may be closed to reduce the size of the camera 10 for convenience. FIG. 1 shows example dimensions for a version of the camera 10 that can be hand held. A suitable latch (not shown) may hold the deployment arms (24 in FIG. 1A) and receiver arms (20 in FIG. 1A) in the position shown in FIG. 1 for transport of the camera 10. After use, the respective arms (and the display 14) may be returned to positions such as shown in FIG. 1 for transportation. FIG. 1 also shows example dimensions for one embodiment of the camera having a transmitter and receivers configured as will be further explained below. The examiner dimensions are about 60 millimeters in diameter and 300 millimeters in length. The foregoing dimensions are intended to make the camera practical to use but are in no way intended to limit the scope of the present invention.

Figure 2:
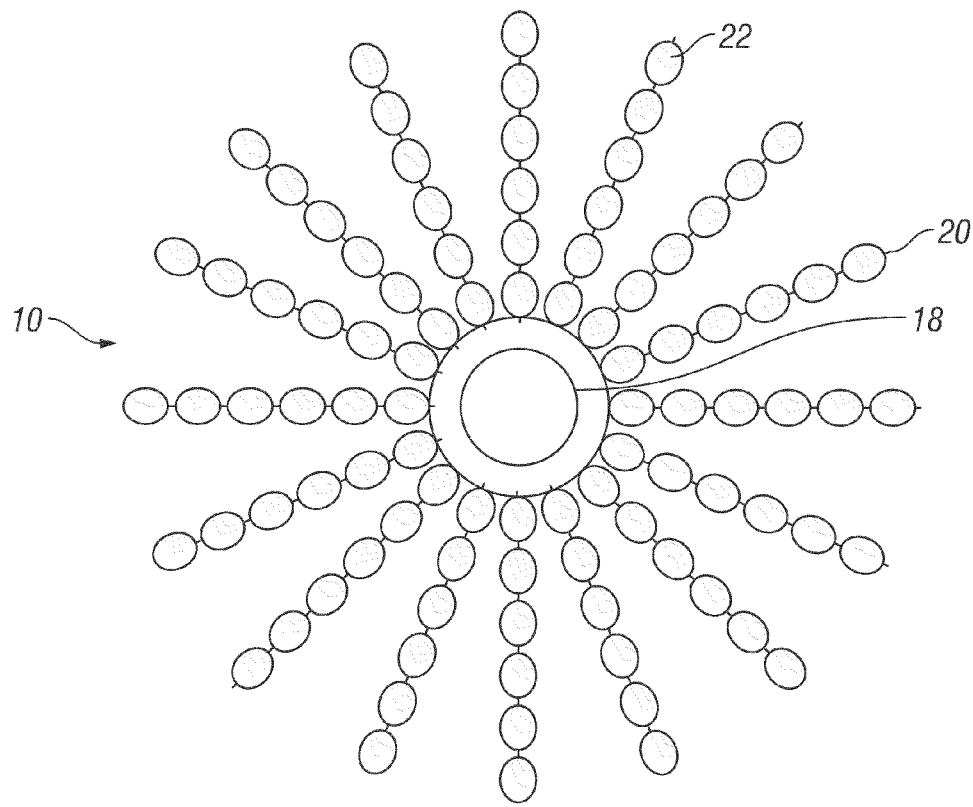
FIG. 2 is an end view of the example camera of FIG. 1 with sensors deployed.

FIG. 2 shows an end view of the camera 10 with the receiver arms 20 in the deployed position to illustrate an example configuration for the receivers 22. When the arms 20 are in the deployed position (e.g., as shown in FIG. 1A), the receivers 22 form a selected pattern which in the present example is essentially a radial line or "star" pattern disposed in a single plane. In the present example, there can be sixteen receiver arms 20, substantially evenly circumferentially spaced about the exterior of the housing (12 in FIG. 1A) and extending in a direction substantially normal to the longitudinal axis thereof, that is, laterally from the centreline of the housing 12. Each receiver arm 20 may include, for example, six receivers 22 as shown disposed at substantially evenly spaced apart positions along each arm 20.

It should be understood that the manner of mounting the receivers 22 to the housing in the present example is primarily for convenience. It is within the scope of the present invention to mount the receivers 22 fixedly or immovably with respect to the housing 12. The receivers 22 may be disposed in other patterns than radial or laterally extending lines.

The physical size of the camera 10 should be practical for a user, e.g., rescue and safety personnel, to carry, for example, by hand or on a tool belt or the like. Considerations of the acoustics with respect to a practical size of the camera 10 have led to a design in which the transmitter (16 in FIG. 1A) can be a relatively small disc at the center of the longitudinal end of the housing (12 in FIG. 1A) and the receivers (22 in FIGS. 1A and 2) may be small acoustic sensors distributed over an area as shown in FIG. 2 with a diameter of about 20 to 25 wavelengths ($\lambda$=8.6 mm at 40 kHz). In one example, the receivers (22 in FIG. 2) may be piezoelectric transducers sold under model number E-152/40 by Massa Products Corporation, 280 Lincoln St., Hingham, Mass. 02043. The foregoing transducers have a diameter of about 11 millimeters and may be spaced from each other (center to center) on the arms by about 1.5$\lambda$ (about 13 millimeters at the selected operating frequency of 40 KHz. The transmitter 16 may be a piezoelectric transducer such as one sold under model number TR-89/B Type 40 by Massa Products Corporation. The foregoing transducer has a diameter of about 32 millimeters.

The transmitter driver 28 may be configured to cause the transmitter 16 to emit acoustic pulses consisting of a selected number of cycles at a center frequency of about 40 kHz. Typically each pulse includes ten or fewer cycles to provide the required bandwidth so that the camera 10 will have a range resolution of a few centimeters and also to provide the bandwidth necessary for the operator to distinguish between various objects using an audio presentation feature (explained below). The range resolution can be determined by the formula 0.5×sound speed×number of cycles×period, whererin the period=1/frequency). The acoustic energy from the transmitter 16 is reflected from objects within the field of the acoustic energy emitted by the transmitter 16. The reflected energy may be detected by the receivers 22. The distance to any particular object (not shown) from the camera 10 is related to the two way acoustic travel time of the acoustic energy. In the present example, the receiver processor 30 may be configured to detect signals from the receivers only within a limited, predetermined time range related to the distance from the camera 10. Such time range may be user selectable, e.g., by the user operating the interface 13. The resulting distance may be shown in the display 14 by suitable programming of the display driver 32. Thus, the user may view a two dimensional display related to objects disposed at a selected distance, or range of distances, from the camera 10.

It has been determined through acoustic modeling that a number of narrow steered beams, each subtending an angle of about two degrees and directable within an angular range of ±20 degrees from the longitudinal axis of the camera 10 can be obtained using the radial-line type of receiver arrangement as shown in FIG. 2. The radial spacing between individual receivers 22 can be about 1.5$\lambda$, or 13 millimeters as explained above. The angular range over which narrow beams are steered can be adjustable down from ±20 degrees from the camera centerline, depending on the range selected and the operator's choice. Such change in angle range of the steered beams may be performed, for example, by reprogramming the receiver processor (30 in FIG. 1A). Such reprogramming may be obtained, for example, by the user operating the user interface (13 in FIG. 1A).

A broad, substantially uniform transmitter beam results from a transmitter whose dimensions are small with respect to the wavelength of the emitted acoustic energy. However, such a beam would be both too broad and have too little power for useful imaging. As the transmitter size is increased with respect to wavelength, however, the beam width reduces and the power output can be increased. Thus, the selected size of the transmitter in the present example represents an optimization of power output and beam width. Referring once again to FIG. 1A, as a matter of physics, a piston-type transmitter (i.e., a transmitter having a flat radiating surface) having a diameter of 4$\lambda$ provides a full beam width of about 15 degrees. This is believed to be insufficient for purposes of acoustic imaging in the intended uses for the present camera 10. In the present invention, therefore, the transmitter 16 can be covered by a spherical cap, e.g. epoxy layer 18 on the so that the effective radiating area can be larger than that of a 4λ diameter piston. The end cap 18 (or as explained above, a similarly shaped transducer) enables a desired transmitter beam width of about twenty degrees in either direction from the centerline of the camera 10 (forty degrees total subtended angle). Typically, the example transmitter transducer described above is a substantially flat disk. In the present example, the layers of material 17 each being about λ/4 in thickness can be applied to the radiating surface of the transmitter 16 to serve as impedance transformers. A final layer of epoxy or similar material can be made into a convex surface, e.g., in a truncated, substantially hemispherical shape as shown at 18 (the end cap) in FIG. 1A so that an effective spherical cap radiator is formed. The effective beam width of a spherical cap is determined by its radius of curvature, and in the present example, the radius (example below) may be selected to provide an effective transmitter beam width of about 20 degrees, that is twenty degrees in any direction from the centreline of the transmitter 16. Alternatively, the active element of the transmitter 16, which may be a piezoelectric material, itself can be formed into a similar convex shape on manufacture. Such configuration of the transmitter would eliminate the need for the impedance matching layers 17 and the end cap 18. The selected transmitter beam width is believed to provide sufficient illumination area for useful imaging, while retaining sufficient transmitted power within the beam for useful imaging.

Figure 5A:
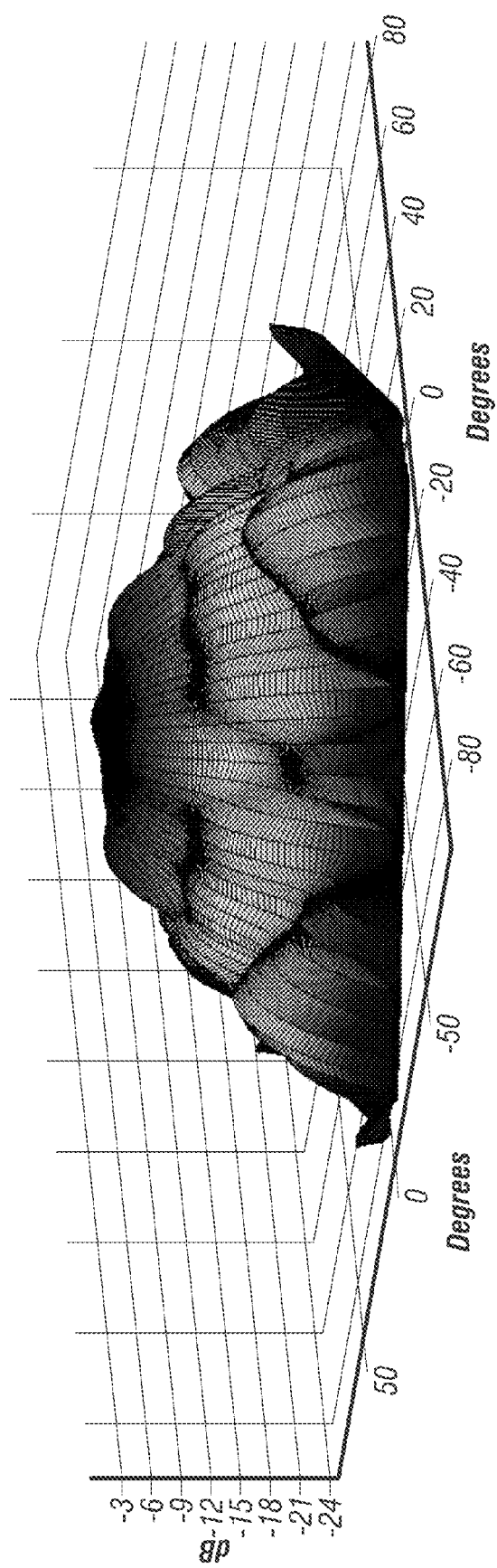
FIGS. 5A and 5B show graphs of a beam pattern of a transmitter for the example camera.
Figure 5B:
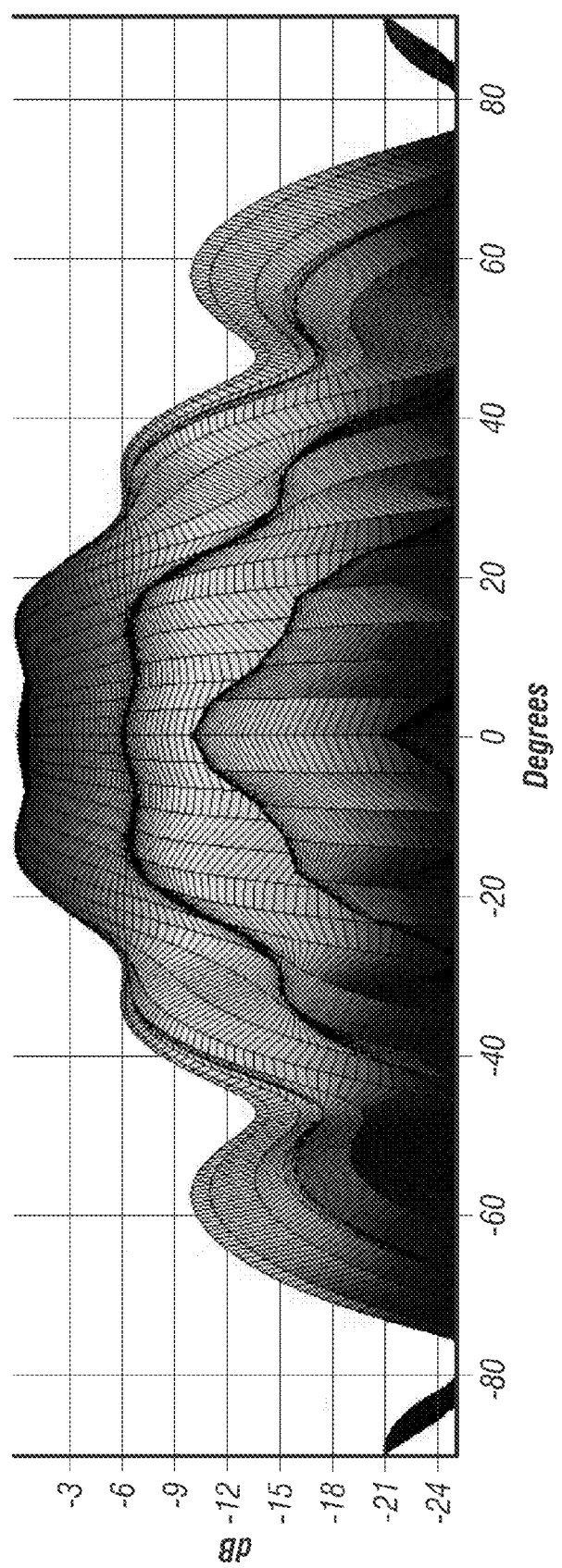

FIGS. 5A and 5B show three and two dimensional graphs, respectively, of the beam pattern for the transmitter (16 in FIG. 1A) configured as explained above. Such pattern is formed using the spherical end cap (18 in FIG. 1A) of epoxy on the radiating surface of the transmitter (16 in FIG. 1A). The end cap (18 in FIG. 1A) as explained above has a diameter of about 4λ (32 millimeters) at 40 KHz. The thickness of the end cap (18 in FIG. 1A) at the radial center thereof is about 0.576λ. The transmitter beam pattern is substantially independent of distance from the transmitter (16 in FIG. 1).

An image may be generated by forming a number of narrow beams (e.g., by applying suitable time delay to the signals detected by each of the receivers to cause effective beam steering) in the reception of acoustic echoes by the receivers (22 in FIG. 2). The beams may be scanned electronically by the receiver processor (30 in FIG. 1A) across the area energized by the transmitter (16 in FIG. 1A) and range (time) gated and sent to the display driver (32 in FIG. 1A) for communication to the display (14 in FIG. 1). The exact scanning pattern is a matter of discretion for the system designer and is not intended to limit the scope of the invention. Also, as previously explained, the effective area (subtended angle) imaged by the beam steering may be user adjustable. A computer program, which may operate on the receiver processor (30 in FIG. 1) may provide all the steered beams (i.e., time delays) to be pre-programmed, so that for each transmitter output pulse, an entire image of the area energized by the transmitter (16 in FIG. 1) is sent to the display (14 in FIG. 1).

Figure 6A:
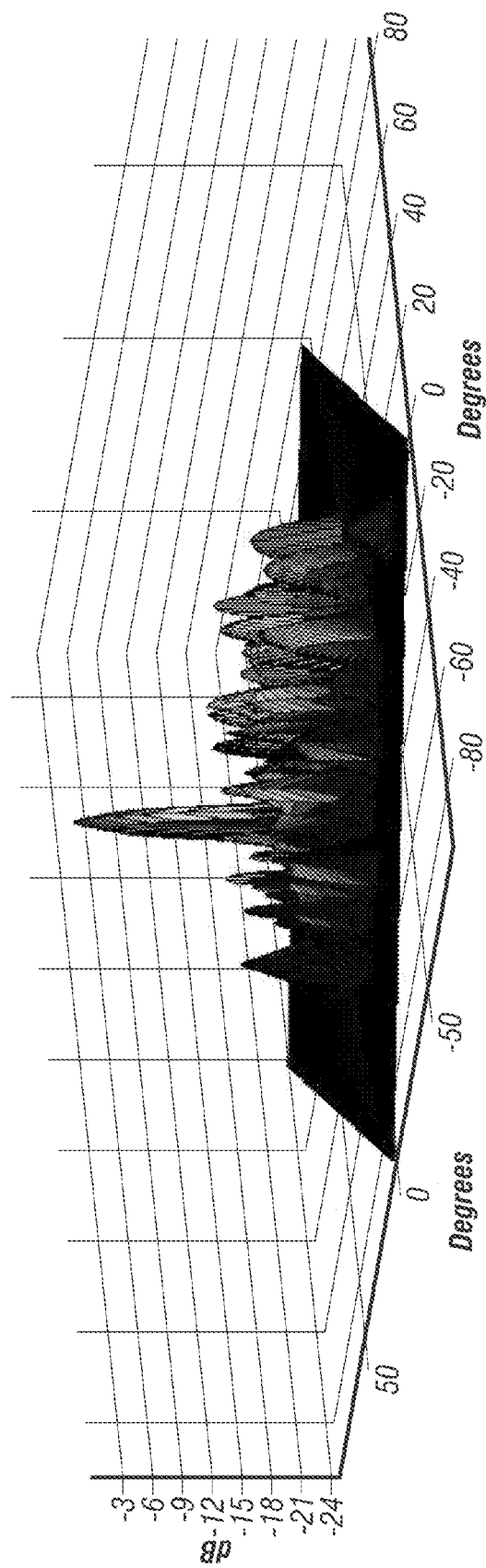
FIGS. 6A and 6B show graphs of a product of the beam patter of the transmitter with steered beams of receiver signals
Figure 6B:
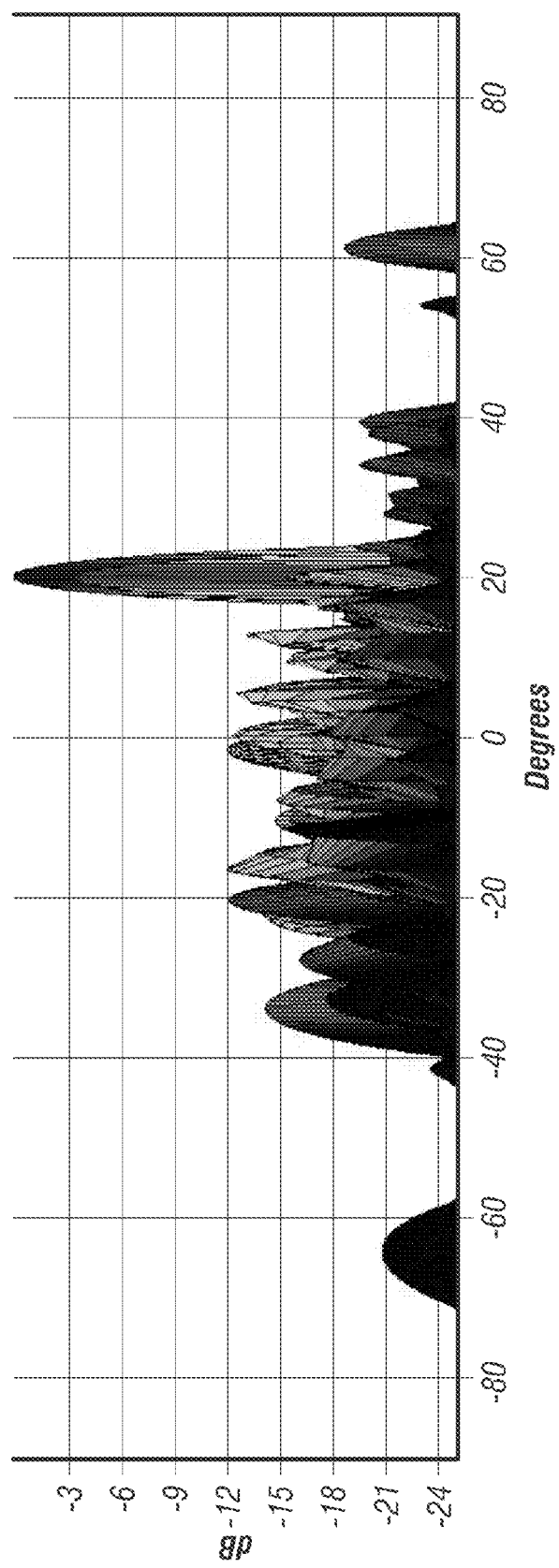

FIGS. 6A and 6B, show, respectively, the amplitude distribution of one of the receiver steered beams, which is the product of the transmitter beam (e.g., FIGS. 5A and 5B) with the steered beams directed at an angle of twenty degrees from the centreline of the camera (10 in FIG. 1). It can be observed that in the direction of the steered beam, the resulting signal is substantially focused on the point of the particular steered beam, with relatively low signal detection from any other direction. Thus, the signal to noise ratio of the steered beam may be sufficient to generate usable images for transmission to the display (14 in FIG. 1).

Figure 3:
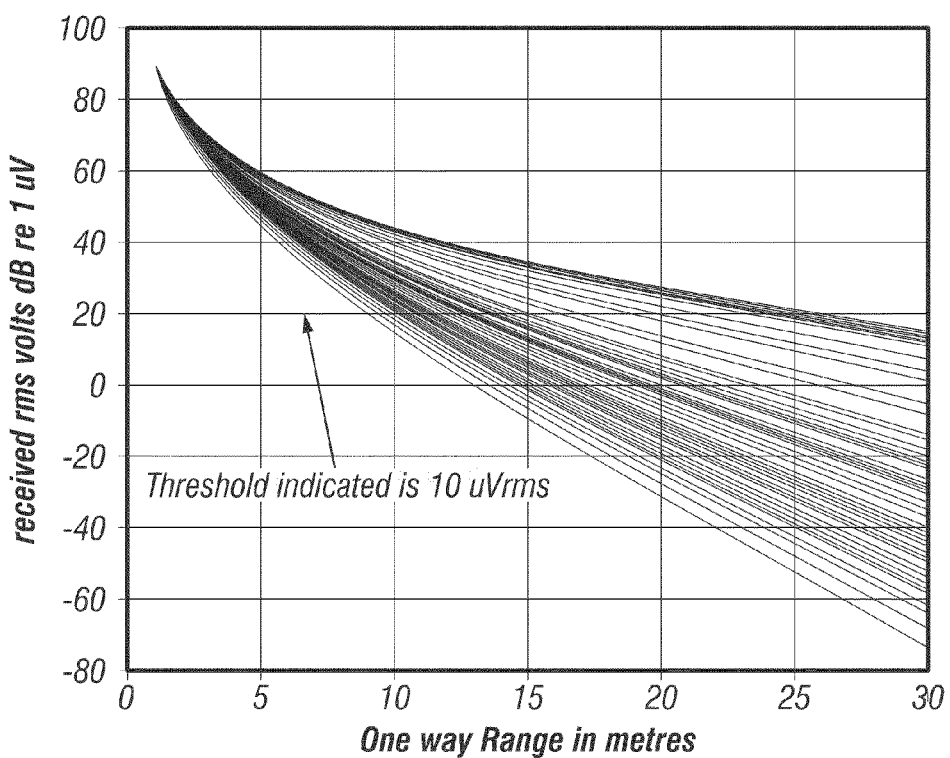
FIG. 3 is a graph of sensor output with respect to distance to a target image object.

FIG. 3 shows graphs of expected receiver signal amplitude with respect to the transmitter signal amplitude for various values of temperature and humidity that may be expected, for example, in the interior of a burning building. What may be observed in FIG. 3 is that under the worst expected acoustic conditions, sufficient signal should be detected by the receivers to provide usable images (wherein the signal to noise ratio is 10 dB or greater) at a range of not less than about 8 meters.

Referring once again to FIG. 1A, in using the camera, the transmitted signal illuminates the scene over the beam width of the transmitter 16. Upon detection of the reflected acoustic energy by the receivers 22, the scene may be imaged as the intensity in each of many pre-formed beams of width about 2 degrees. The total signal detection time will extend effectively for a time consistent with the two way travel time to a range of about 10 meters. The display 14 may show, for example, an amplitude representation of the detected signal present in a selected range gate, for example, 0.5 meters. This range gate can be moved in or out by the user operating the interface 13 as explained above. If an object of interest is observed by the user, the user may desire to listen to an audible version of the reflected signal. This may be performed, for example, by the user directing the camera so that the object is imaged approximately in the center of the display 14. The transmitter driver 28, receiver processor 30 and display driver 32 may be configured to enable the user to select an operating mode wherein the transmitter 16 emits an acoustic pulse, and the waveform of the receiver signals is communicated to the display 14. A typical response is presented in FIGS. 4A and 4B, where acoustic pulses are generated at 40 kHz and typical echoes from two objects are exhibited.

Figure 4A:
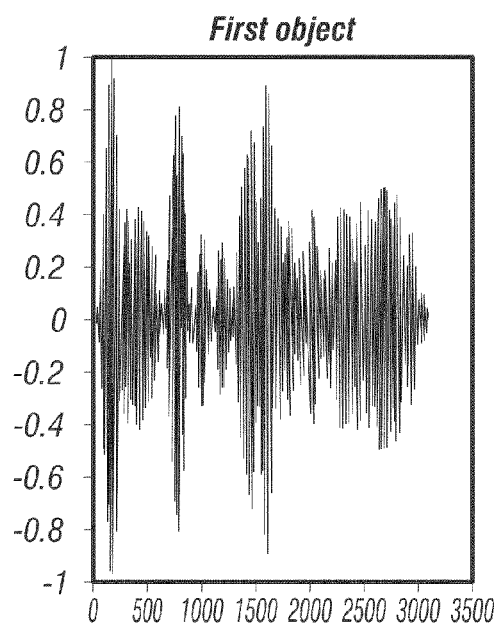
FIG. 4A is an example of signals detected from a human object.
Figure 4B:
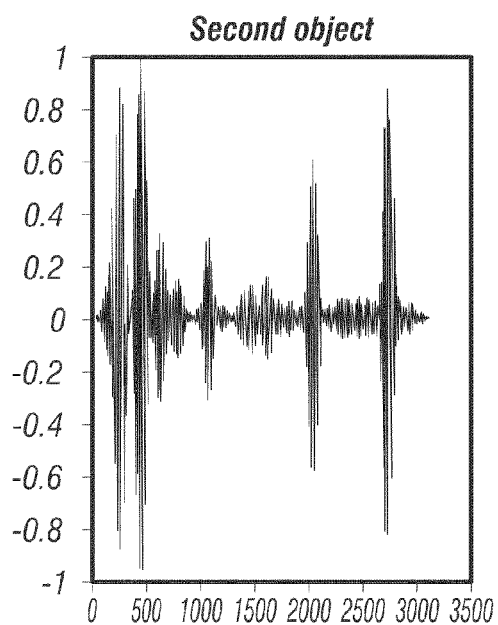
FIG. 4B is an example of signals detected from an inanimate object.

The first type of object may be an extended object which generates lots of reflected signals without any really obvious highlights, i.e., it has few corners or sharp edges to reflect acoustic energy distinctly. Such object could be, for example, an upholstered sofa or a human body. A graph of detected signal response from such a type of object is shown in FIG. 4A. The other type of object is one which produces reflected signals from specific portions thereof, i.e., it has highlights. A graph of detected signal response from such an object is shown in FIG. 4B. Such an object could be an artifact like a chair or desk, or an oil drum, for example. The present explanation is to demonstrate type of audio representations from different objects that may be distinguishable by the human ear.

The foregoing object discrimination has been simulated as follows. A simulated Hann shaded transmitter output signal at 40 kHz is transmitted with a duration determined by a predetermined bandwidth, for example about 3 KHz. The ability of the target to scatter the incident signal back into the direction of incidence may be characterized by a series of impulses. The transmitted signal is convolved with the series of impulses to produce an expected receiver signal. The duration of the sequence of impulses is determined by the range (time) gate. The actual duration of the reflected signals from a range gate of about 1 meter is about 3 milliseconds. If such signal is presented as audio at 8 KHz, being a reduction in frequency by a factor of 5, for example, the 3 milliseconds becomes 15 msecs.

In the present example, the echo from the object is detected. It may be converted in the receiver processor (30 in FIG. 1A) into a series of samples at time intervals suitable for digitally representing the 40 kHz signal. As an example, the processor (30 in FIG. 1A) may sample the receiver signals every microsecond, corresponding to a sampling frequency of 1 MHz. This signal is then passed through software, which may be implemented in the receiver processor (30 in FIG. 1A) to re-sample the digital samples at a different rate, as for example, 5, microseconds. The re-sampled signal may be within the audio frequency range (e.g., up to about 20 KHz) and communicated to the transducer (15 in FIG. 1A) in the user interface (13 in FIG. 1A). The echo signal will thus be audible to the user in this example as a signal centered at 5 times lower frequency than the original acoustic pulse, which is 8 kHz.

A single occurrence of such an audio signal (15 msec) is not sufficient for any determinable human reaction. To overcome such limitation the user may keep the camera directed at the object for a couple of seconds, for example, wherein the acoustic pulsing, detection and communication. By causing repeated echo detection and re-sampling, the audible signal emitted by the transducer (15 in FIG. 1A) may be heard by the user as an effectively continuous sound. It is expected that the user will be able to audibly discriminate between the first type of object and the second type of object from the audible signals. Simulations have confirmed the foregoing expectation.

An acoustic camera according to the various aspects of the invention may enable user location of objects where visual or thermal detection is not possible. In some examples, an audible signal may enable the user to discriminate the type of object detected by the camera.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An acoustic camera, comprising:
    an acoustic transmitter disposed at one longitudinal end of a housing, the transmitter having a convex radiating surface, wherein a diameter of the transmitter is about four times a wavelength of acoustic energy emitted by the transmitter;
    a plurality of acoustic receivers disposed at spaced apart locations in a selected pattern extending laterally from the housing;
    a signal processor in signal communication with the acoustic receivers, the signal processor configured to cause the acoustic receivers to be sensitive along steered beams; the signal processor configured to cause an end of the steered beams to move through a selected pattern within a beam width of the acoustic energy emitted by the acoustic transmitter, the signal processor configured to operate a visual display device to generate a visual representation corresponding to acoustic energy detected by the acoustic receivers; and
    a visual display device in signal communication with the signal processor.

2. The camera of claim 1 wherein the signal processor is configured to read amplitude of the steered beams.

3. The camera of claim 2 wherein the signal processor is configured to read amplitude of the steered beams within a selectable time range.

4. The camera of claim 1 wherein a radius of curvature of the convex radiating surface is selected to provide a beam width of the emitted acoustic energy of about twenty degrees in each direction from a centerline of the acoustic transmitter.

5. The camera of claim 1 wherein the steered beams have a width of about two degrees.

6. The camera of claim 1 wherein the selected receiver pattern comprises lines extending laterally from a centerline of the housing.

7. The camera of claim 6 wherein each line is disposed on an arm coupled to the housing.

8. The camera of claim 7 wherein each line comprises at least six of the acoustic receivers, each of the acoustic receivers on each arm spaced apart from an adjacent one of the acoustic receivers by about 1.5 times a wavelength of the emitted acoustic energy.

9. The camera of claim 1 wherein the wavelength is about 8.6 millimeters.

10. The camera of claim 1 wherein the signal processor is configured to resample signals detected by the acoustic receivers to generate an audio frequency range signal, and wherein the camera comprises a transducer in signal communication with the signal processor configured to generate an audible output of the audio frequency range signal.

11. The camera of claim 1 wherein the arms are configured to pivot with respect to the housing between an open position and closed position substantially flat against the housing.

12. The camera of claim 1 wherein the convex radiating surface comprises epoxy disposed on a flat acoustic transducer element.

13. The camera of claim 12 further comprising at least one impedance matching layer disposed between the transducer element and the epoxy, the at least one impedance matching layer having a thickness of about one-quarter wavelength of the emitted acoustic energy.

* * * * *